Feb. 20, 1940.   R. C. PIERCE   2,190,849
REEL LIFTING MEANS
Filed Sept. 29, 1938

INVENTOR.
ROBERT C. PIERCE
BY McConkey Dawson & Booth
ATTORNEYS.

Patented Feb. 20, 1940

2,190,849

UNITED STATES PATENT OFFICE 2,190,849

REEL LIFTING MEANS

Robert C. Pierce, Niles, Mich., assignor to National Standard Company, Niles, Mich., a corporation of Michigan Application September 29, 1938, Serial No. 232,267

5 Claims. (Cl. 254—131)

This invention relates to reel lifting means and more particularly to means for lifting wire reels or the like into position to be engaged by supporting shafts or the like.

One of the objects of the invention is to provide reel lifting means which is extremely simple yet which is capable of handling large heavy reels easily and quickly.

Another object of the invention is to provide reel lifting means which tends to lock itself in raised position. Thus once the lifting means is raised it will stay raised until it is released or intentionally lowered.

Other objects, advantages and novel features of the invention will be apparent from the following description of the accompanying drawing in which.

Figure 1:
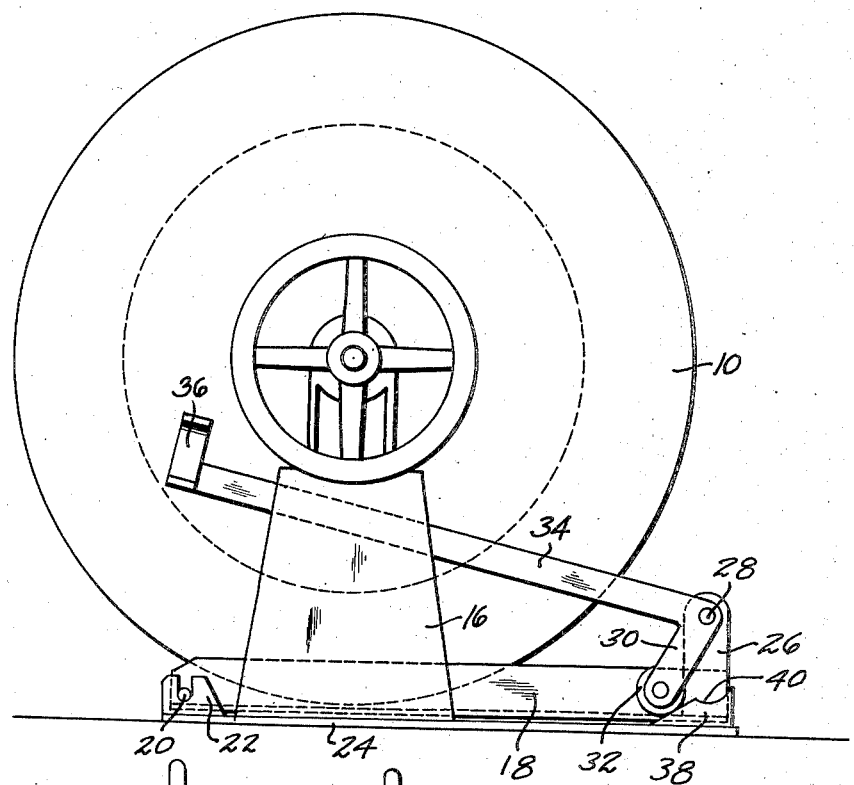
Figure 1 is a side elevation of reel lifting means embodying the invention.
Figure 2:
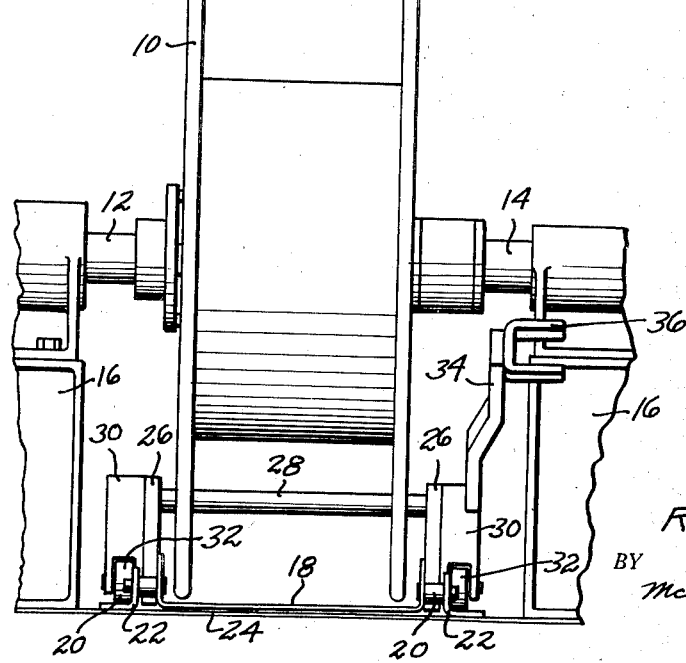
Figure 2 is a partial end elevation.

As shown, a reel 10, which may be the windup reel of a wire drawing machine, is rotatably supported by a pair of opposed shafts 12 and 14 mounted on spaced pedestals 16. Suitable means, not shown, are provided to move the shafts axially into and out of supporting engagement with the reel and one of the shafts, as 12, is provided with suitable driving means for driving the reel. This mechanism preferably takes the form of that more particularly described and claimed in my copending application Serial No. 232,268 filed September 29, 1938.

Between the pedestals 16 there is arranged a channel member 18 wider than the reel and pivoted at one end by pins 20 fitting in suitable brackets 22 carried by the floor or by a bottom plate 24. The other end of the member 18 normally rests on the floor and is formed with upwardly extending arms or brackets 26.

The arms 26 serve to carry means for raising the other end of the channel member 18. As shown, such means comprises a cross shaft 28 journaled in the arms 26 and carrying at its ends a pair of arms 30 forked at their lower ends and rotatably supporting rollers 32. One of the arms 30 is preferably formed as a bell crank lever having a second arm 34 extending toward the front of the machine where it terminates in a foot pedal 36. The rollers 32 are engageable with cam tracks 38 mounted on the floor or the plate 24 and terminating at their tops in arcuate depressions 40 to hold the rollers in elevated position.

In mounting a reel the pedal may be depressed, camming up the rear end of the channel member 18, and the reel may be rolled up this member into a position to be engaged by the supporting shafts 12 and 14. In some cases it may be desired to roll the reel onto the member 18 and then depress the pedal to raise the reel. After the shafts have been moved into position the pedal may be raised to lower the member 18 and leave the reel suspended on the shafts.

In removing a full reel, the pedal is again depressed to raise the channel member and lift the weight of the reel from the shafts. The shafts may then be withdrawn and the reel rolled down the channel member to the floor or lowered to the floor by raising the pedal.

While only one embodiment of the invention has been shown and described in detail it will be understood that numerous changes might be made therein and it is not intended to limit the scope of the invention to the exact form shown nor otherwise than by the terms of the appended claims. This application is a continuation in part of my copending application, Serial No. 68,856, filed March 14, 1936.

What is claimed is:

1. In a reel mounting having a reel-supporting shaft, means for lifting a reel into a position coaxial with said shaft comprising a platform pivoted on horizontal pivots at one end and having a horizontal cross shaft journalled in its other end, downwardly projecting levers on said cross shaft provided with cam rollers, inclined surface cam members up which said rollers will roll when said shaft is rotated, and means for rotating said shaft, said cam members having arcuate portions adapted to hold said rollers in elevated position.

2. In a reel mounting having reel supporting means, means for lifting a reel into position to be engaged by said supporting means comprising a platform pivotally supported adjacent one end, a lever pivoted on the other end of the platform, a roller carried by the free end of said lever, means for rocking the lever, and track means carried by a relatively fixed part and engageable with said track roller to raise said other end of the platform when the lever is rocked about its pivot.

3. In a reel mounting having reel supporting means, means for lifting a reel into position to be engaged by said supporting means comprising a platform pivotally supported adjacent one end, a lever pivoted on the other end of the platform, a roller carried by the free end of said lever, means for rocking the lever, and track means carried by a relatively fixed part and engageable with said roller to raise said other end of the platform when the lever is rocked about its pivot, said roller and said track means being so constructed and arranged that when said other end of the platform has been raised they tend to hold it raised.

4. In a reel mounting having reel supporting means, means for lifting a reel into position to be engaged by said supporting means comprising a platform pivotally supported adjacent one end, a lever pivoted on the other end of the platform, means carried by a relatively fixed part and cooperating with said lever to raise said other end of the platform when the lever is rocked about its pivot, and an elongated arm movable about a horizontal pivot and connected to rock said lever, said arm having a pedal portion at its free end movable substantially vertically to rock the lever.

5. In a reel mounting having reel supporting means, mans for lifting a reel into position to be engaged by said supporting means comprising a platform pivotally supported adjacent one end, cam and lever means carried respectively by the other end of said platform and by a relatively fixed part, and means to rock the lever thereby to cam said other end of the platform upwardly, said cam including a portion tending to hold the lever in its rocked position with the platform raised.

ROBERT C. PIERCE.